United States Patent [19]
> Swidwa et al.

[11] Patent Number: 4,905,260
[45] Date of Patent: Feb. 27, 1990

[54] NUCLEAR REACTOR CONTAINMENT ARRANGEMENT WITH PERMANENT CAVITY SEAL RING

[75] Inventors: Kenneth J. Swidwa, N. Versailles; Robert B. Salton, Plum Borough; James R. Marshall, Penn Hills, all of Pa.

[73] Assignee: Westinghouse Electric Corp., Pittsburgh, Pa.

[21] Appl. No.: 270,879

[22] Filed: Nov. 14, 1988

[51] Int. Cl.⁴ .................. G21C 19/00; G21C 11/00
[52] U.S. Cl. ................................ 376/203; 376/260; 376/263; 376/287
[58] Field of Search ............... 376/203, 205, 287, 260, 376/262, 263

[56] References Cited

U.S. PATENT DOCUMENTS

| | | | |
|---|---|---|---|
| 3,633,784 | 1/1972 | Taft et al. | 376/203 |
| 3,812,008 | 5/1974 | Fryer | 176/30 |
| 4,001,079 | 1/1977 | Rylatt | 376/203 |
| 4,070,221 | 1/1978 | Anthony | 156/245 |
| 4,126,515 | 11/1978 | Klotz et al. | 376/287 |
| 4,170,517 | 10/1979 | Meuschke et al. | 176/87 |
| 4,214,760 | 7/1980 | Godfrey | 277/34.3 |
| 4,584,163 | 4/1986 | Hankinson | 376/205 |
| 4,650,643 | 3/1987 | Anthony | 376/287 |
| 4,747,993 | 5/1988 | Hankinson et al. | 376/205 |
| 4,753,768 | 6/1988 | Puri | 376/203 |
| 4,758,402 | 7/1988 | Schukei et al. | 376/205 |

Primary Examiner—Harvey E. Behrend
Attorney, Agent, or Firm—M. G. Panian

[57] ABSTRACT

An annular seal ring between a reactor pressure vessel and a containment wall is disposed in an annular expansion gap therebetween, having a support ring and inner and outer upwardly extending cylindrical sections. The inner cylindrical section is disposed below a flange on the reactor and has a flexible seal therebetween, while the outer cylindrical section terminates substantially parallel and spaced from a shelf in the containment wall with a flexible seal therebetween. The annular seal ring is supported by radial support beams, while support rods depending from the support ring position neutron shielding material in the annular expansion gap. Manways and ports provide access to the gap and thermal insulation is provided below the neutron shielding material to direct cooling air from the annular gap up through opened manway and port.

17 Claims, 3 Drawing Sheets

NUCLEAR REACTOR CONTAINMENT ARRANGEMENT WITH PERMANENT CAVITY SEAL RING

CROSS-REFERENCE TO RELATED APPLICATION

This application is related to application Serial No. 270878, filed on even dated herewith in the names of the present inventors, entitled "Permanent Cavity Seal Ring for a Nuclear Reactor Containment Arrangement", which application is assigned to the assignee of the present invention.

BACKGROUND OF THE INVENTION

This invention relates to a nuclear reactor containment arrangement wherein a permanent cavity seal ring extends across an annular expansion gap between a reactor pressure vessel and a containment wall to provide a water tight seal therebetween.

A nuclear reactor pressure vessel is typically positioned in a cavity or containment system formed of concrete and shielding material. The reactor pressure vessel is spaced from the containment wall so as to provide an annular expansion gap and permit the vessel to expand in both a horizontal and vertical direction. An upper annular portion above the vessel serves as a refueling canal. The refueling canal, while maintained dry during reactor operation, is filled with water during refueling of the nuclear reactor. In refueling, the head of the reactor pressure vessel is removed and the refueling canal is filled with borated water and provides adequate shielding in order to maintain radiation levels within acceptable limits.

The reactor pressure vessel has flanges which secure the head assembly to the body of the vessel, with a lower flange on the peripheral wall of the vessel near the vessel opening that is sealable to the containment wall. The seal between the reactor pressure vessel and the containment wall serves as a floor for the body of water that is placed in the refueling canal.

It has previously been proposed to use removable seals to seal the vessel to the containment wall, such as removable gasket-type seal rings, but such elastomeric gaskets are susceptible to degradation and leakage and require inordinate installation time and effort.

During normal reactor operation with a removable seal, the annular expansion gap between the reactor pressure vessel and the containment wall is covered with portable thermal insulation and a large ring-shaped water tank for neutron shielding. These large components must be removed for refueling operations and later reinstalled. Since the concrete structure of the containment wall, on the outside of the annular expansion gap, must be kept below design temperature limits, cooling air is forced up between the face of the concrete liner in the cavity and out through openings in the supports of the neutron shield tanks during operation of the reactor. In addition, any personnel access for instrumentation service and reactor vessel nozzle inspections is normally only available during the period when all of the hardware is removed from the top of the annular expansion gap, i.e. the removable seal, shielding and insulation.

In order to solve the problems associated with temporary or removable seals, the installation of permanent seals, such as that described in U.S. Pat. No. 4,747,993, to Meuschke et al., assigned to the assignee of the present invention, and the contents of which are incorporated by reference herein, were developed. The permanent seal ring described in U.S. Pat. No. 4,747,993 has an annular ring plate which is formed as a step-shaped cross-section, having a first annular portion that is fixed to a mounting plate on the containment wall, a cylindrical portion, and a second annular portion which extends horizontally past, and is spaced from, the outer edge of the flange on the reactor pressure vessel. An L-shaped flexure member is affixed to the second annular portion and has one leg thereof secured to the second annular portion and the other leg which extends to and sealingly engages the flange. This type of permanent sealing ring, while having superior properties over prior art rings, is designed to have a backup member, in addition to the sealing flexure member, in the event that the seal between the other leg and the flange is disturbed by deflective or other forces. This backup member, which is a backup plate and flashing, provides a backup structure for the flexure member to preclude the possibility of major leakage of shielding water in the event of structural failure of the flexural member. While the backup member does not form a water-tight seal it does function as a flow restrictor to prevent a catastrophically sudden and/or complete loss of shielding water from the refueling canal during refueling operations. The support arms of this annular ring seal also use leveling bolts which engage the flange for initially aligning the ring during installation and providing auxiliary support for the annular ring seal during the refueling operation.

It is an object of the present invention to provide a permanent cavity seal ring for a nuclear reactor containment arrangement as a single structure which results in water-tight sealing, neutron shielding, thermal insulation, containment wall cooling and service access to the annular expansion gap.

SUMMARY OF THE INVENTION

With this object in view, the present invention provides an annular ring seal that extends across the annular expansion gap between a reactor pressure vessel, the vessel having a peripheral wall and a horizontally outwardly extending flange, and a containment wall spaced from and surrounding the reactor pressure vessel peripheral wall, to provide a water-tight seal therebetween.

The annular ring seal is disposed in the annular expansion gap and has a support ring, and inner and outer upwardly extending cylindrical sections. The inner section is disposed beneath and spaced from a horizontally outwardly extending flange on the vessel and the outer section terminates at a location substantially parallel to, and spaced from, a shelf on the containment wall. A vertically extending inner seal extends between the inner cylindrical section and the horizontally outwardly extending flange to seal the space between the inner cylindrical section and the flange on the vessel, while a horizontally extending outer seal extends between the top edge of the outer cylindrical section and a shelf on the containment wall to seal the space therebetween.

The support ring preferably has support rods which depend downwardly therefrom in the annular expansion gap with neutron shielding material supported by the support rods in the annular expansion gap between the reactor pressure vessel and the containment wall. Manway access hatches and detection well hatches are provided in the support ring and removable plugs formed in the neutron shielding material to provide access to components below the neutron shielding material within the annular expansion gap.

Thermal insulation in the form of an upper vertical section, lower vertical section and horizontally connecting section is provided, the upper vertical section having an annular air flow seal which extends to the inner cylindrical section of the annular seal ring, that directs cooling air from the annular expansion gap up through the opened manway access hatches and the detection well hatches. Removably doors are formed in the horizontally connecting section of the thermal insulation.

BRIEF DESCRIPTION OF THE DRAWINGS

The invention will become more readily apparent from the following description of a preferred embodiment thereof shown, by way of example only, in the accompanying drawings, wherein.

DETAILED DESCRIPTION

Figure 1:
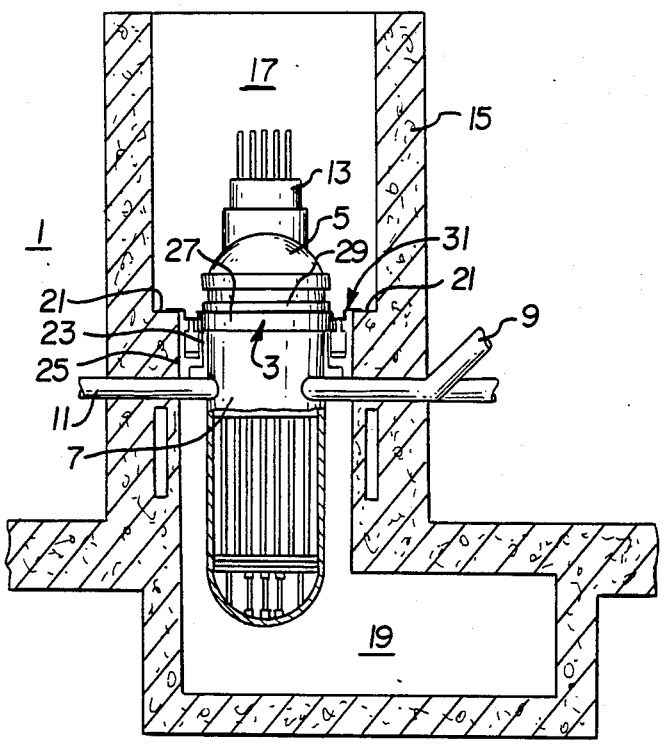
FIG. 1 is an elevational view partly in cross-section of a reactor containment arrangement incorporating a permanent cavity seal ring according to the present invention.

Referring now to FIG. 1, a nuclear reactor containment arrangement 1 according to the present invention is illustrated wherein a nuclear reactor pressure vessel 3 has a removable head portion 5 and body portion 7. The reactor pressure vessel 3 has a coolant flow inlet means 9 and coolant flow outlet means 11 formed integrally with and through the cylindrical wall of the body portion 7. The reactor pressure vessel 3 contains a nuclear core (not shown) which has a plurality of nuclear fuel elements which generate heat depending primarily on the position of control means, the pressure vessel housing 13 of which is shown. The heat generated by the reactor core is conveyed from the core by coolant flow entering through inlet means 9 and exiting through outlet means 11, as is conventional and known in the art.

The reactor pressure vessel with its head assembly is maintained within a reactor cavity defined by a concrete containment wall 15 which is divided into an upper portion or refueling canal 17 and a lower portion or well 19 which contains the body portion 7 of the reactor pressure vessel 3. A shelf 21 is provided in the containment wall 15 which divides the upper portion or refueling canal 17 from the lower portion or well 19 of the reactor cavity.

Between the peripheral wall 23 of body portion 7 of the reactor pressure vessel 3 and the containment wall 15 there is provided an annular expansion gap 25 which is to accommodate for thermal expansion and contraction of the reactor pressure vessel 3 during cyclic operation of the reactor. The peripheral wall 23 of the body portion 7 of pressure vessel 3 has a horizontally outwardly extending flange 27 thereon, while an upper flange 29 is also provided on the head portion 5, which head portion is removed during the refueling operation.

An annular ring seal 31 is provided which accommodates for normal thermal expansion and contraction of the reactor vessel 3 during operation of the reactor while also sealing off the refueling canal 17 from the well 19 of the reactor cavity. The purpose of the annular seal ring 31 is to prevent water, which is used to flood the refueling canal 17 during refueling operations, from entering the lower portion or well 19 of the cavity.

Figure 2:
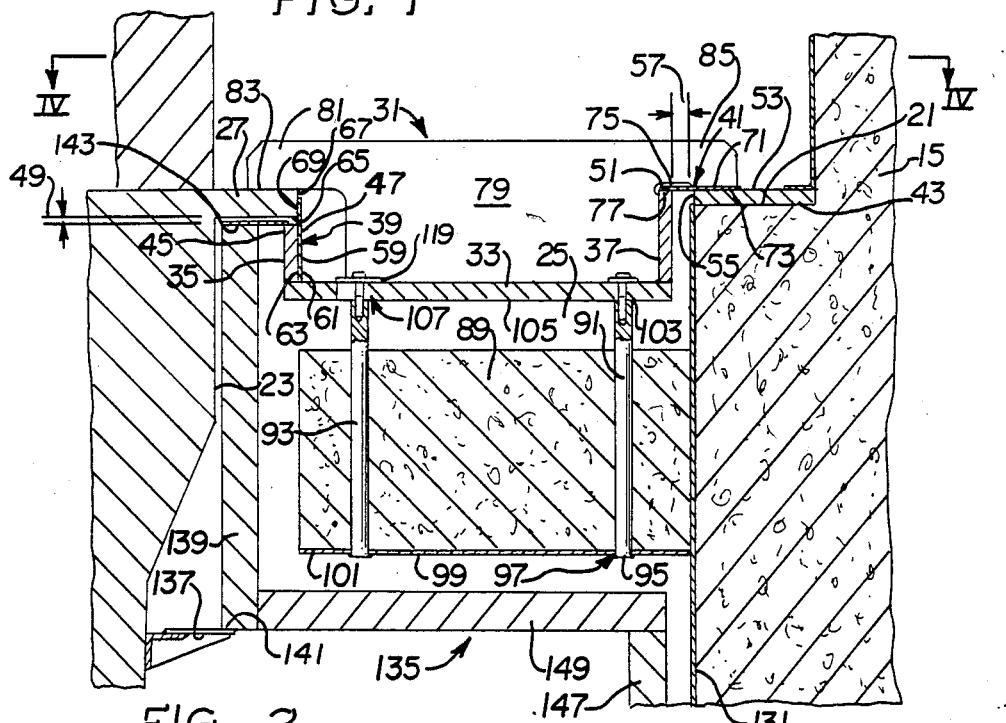
FIG. 2 is an enlarged cross-sectional view of a portion of the permanent cavity seal ring of the present invention.

The annular seal ring 31, as illustrated by reference to FIG. 2, has a support ring 33, inner cylindrical section 35, outer cylindrical section 37, a vertically extending flexible inner seal 39 and a horizontally extending flexible outer seal 41.

The support ring 33 is disposed within the annular expansion gap 25 below the horizontally extending flange 27 on the reactor pressure vessel and also below the shelf 21 in the reactor containment wall, which shelf has a mating plate 43 thereon. The inner cylindrical section 35 is fixed to the support ring 33, such as by welding, and is disposed beneath the horizontally extending flange 27, with the upper edge 45 thereof spaced in close proximity from the lower surface 47 of the flange 27 to provide a first clearance gap 49 therebetween. The outer cylindrical section 37 of the annular seal ring 31, which is fixed to the support ring 33 such as by welding, also extends upwardly therefrom and has a terminus 51, the terminus 51 being at a location substantially parallel with the upper surface 53 of the mating plate 43 on shelf 21, and spaced from the inner surface 55 of the mating plate 43 and containment wall 15 to provide a second clearance gap 57 therebetween.

The vertically extending flexible inner seal 39 has a lower end 59 that is fixed, such as by welds 61, to the outer surface 63 of the inner cylindrical section 35, and extends across the first expansion gap 49, and an upper end 65 that is fixed to the outer peripheral surface 67 of the horizontally outwardly extending flange 27, such as by welds 69. By positioning the inner cylindrical section 35 beneath the horizontally extending flange 27 of the reactor pressure vessel 3, the annular seal ring 31 is trapped beneath the flange 27 so as to prevent the same from being vertically dislodged upwardly in the event of a loss of coolant or other disruptive event.

The horizontally extending flexible outer seal 41 has an outer end 71 that is fixed to the upper surface 53 of the mating plate 43, such as by welds 73 and extends across the second clearance gap 57, and an inner end 75 that is fixed to the terminus 51 of the outer cylindrical section 37, such as by welds 77. The vertically extending flexible inner seal 39 and horizontally extending flexible outer seal 41 may be shop welded to the inner cylindrical section 35 and outer cylindrical section 37, respectively, of the annular sealing ring 31, and field welded to the horizontally outwardly extending flange 27 and mating plate 43, respectively. As can be seen by the drawings, the configuration of the inner and outer seals is such that no catastrophic failure is possible under a head of water, such that redundant passive seals are not required to preclude draining of the refueling canal water pool. The worst case situation would be leakage from a cracked seal weld, which would be insignificantly affected by any second passive or redundant seal.

The support ring 33, and inner and outer cylindrical sections 35, 37 are supported in the annular expansion gap 25 by radial support beams 79 which span the annular expansion gap 25, one end 81, the radially inward end, of the radial support beams 79 resting on the upper surface 83 of the horizontally outwardly extending flange 27 on the reactor pressure vessel body portion 7, and the other end 85, the radially outward end, of which rests on the mating plate 43 on the shelf 21 in the containment wall 15.

Although sized to do so, the inner and outer seals 39, 41 and their welds 61, 69, 73, 77 are not the primary support for the weight of water in the refueling canal on the support ring 33. They are provided primarily to seal against water leakage and handle differential motion of the surfaces caused by thermal or seismic events. The radial support beams 79 normally provide the primary support for these heavy weight loads. In effect, the support ring 33 has a redundant support system.

Figure 3:
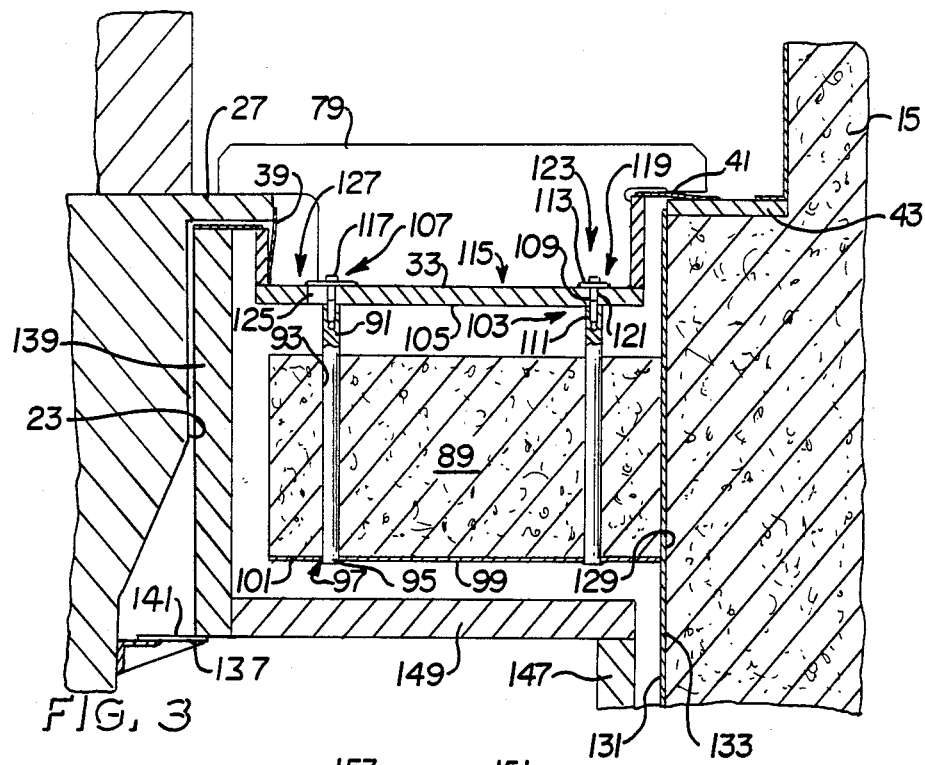
FIG. 3 is a view similar to that of FIG. 2 showing the deflected configuration of the vertically extending inner seal and the horizontally extending outer seal of the permanent cavity seal ring.

As illustrated in FIG. 3, the vertically extending inner seal 39 compensates for radial expansion of the reactor pressure vessel 3, while the horizontally extending flexible outer seal 41 compensates for vertical expansion of the reactor pressure vessel 3.

Figure 4:
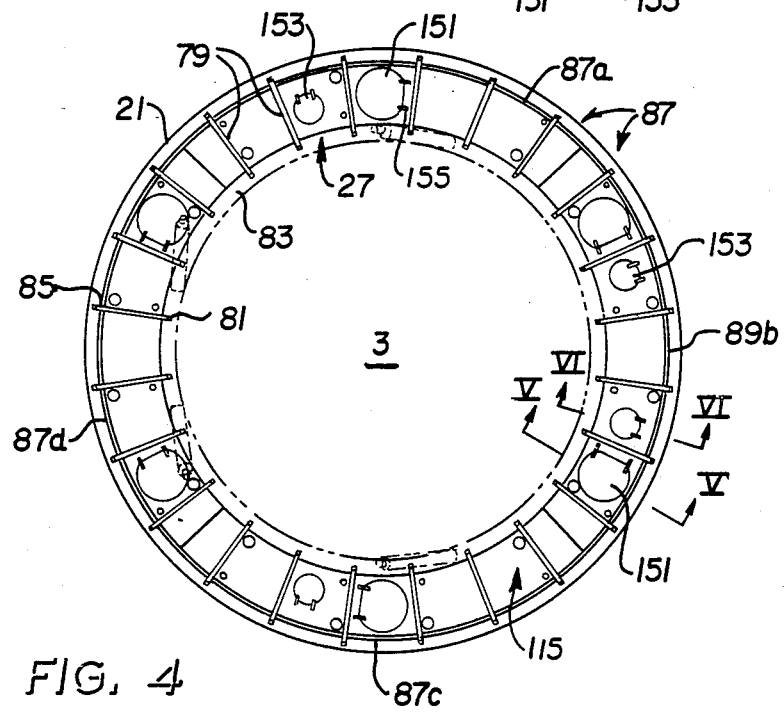
FIG. 4 is a cross-sectional plan view of the reactor containment arrangement incorporating the cavity seal ring of FIG. 2 as viewed through section IV—IV thereof.

The annular seal ring 31, as illustrated in FIG. 4 is provided in a plurality of arcuate segments 87, such as four arcuate segments 87a, 87b, 87c and 87d. The arcuate segments 87 are splice welded together after installation of the annular seal ring on the site.

Each of the arcuate segments 87 incorporate neutron shielding material suspended in the annular expansion gap 25. The neutron shields 89, in the form of arcuate blocks of a neutron shielding material, are suspended from the support ring by downwardly depending support rods 91. The support rods 91 pass through apertures 93 in the neutron shields 89 (FIG. 3) and have a shoulder 95 about the bottom end 97 thereof upon which the neutron shields rest. A metallic skin 99 may be provided on the lower surface 101 of the neutron shields to reinforce the same. The upper end 103 of the support rods 91 are pulled flush with the underside 105 of the support ring 33 and fixed thereto by use of fasteners 107, such as threaded bolts 109 which engage a threaded bore 111 in the support rods 91. Washers 113 may be positioned between the upper surface 115 of the support ring 33 and a head 117 of the threaded bolts 109. The fasteners 107 are then seal welded, as at 119, on the site after installation of the annular ring seal 31. A first aperture 121 is provided on the outer annular region 123 of the support ring 33, while a second aperture 125, is provided on the inner annular region 127 of the support ring 33. The outer periphery 129 of the neutron shield 89 is abutted against a conventional liner 131 about the inner periphery 133 of the containment wall 15. As shown, one of the apertures may be in the form of a radial slot while the other is a circular aperture, for the purpose of inserting the shields 89 into the cavity and aligning them flush with the liner 131.

The neutron shields 89 are formed from a heat resistant type of neutron shielding material of cementitious properties. It may be supplied either in powdered form to which water is added on site or it may be supplied as precast blocks. Due to possible shipping damage to precast blocks, it is preferred that the shielding material be mixed on site in steel support trays used for mounting and installation. Such formation of the neutron shield blocks would be done outside the containment structure several days before installation is to take place.

As is conventional, thermal insulation is provided about the pressure vessel 3 between the peripheral wall 23 thereof and the metal liner 131 on the inner periphery 133 of the wall 15. The thermal insulation 135 in the present construction is installed in a manner that allows placement of the neutron barrier 89, with access to monitoring devices and so as to permit cooling flow of air through the annular expansion gap 25. A platform 137 (FIG. 5) is fixed to the peripheral wall 23 of the reactor pressure vessel in the expansion gap 25 vertically spaced below the horizontally outwardly extending flange 27. An upper vertical section 139 of thermal insulation 135 has a lower end 141 which rests on the platform 137 and an upper end which teminates at 143, closely adjacent to, but spaced from, the lower surface of the flange 27. The upper vertical section of thermal insulation 139 extends between the peripheral wall 23 of the reactor pressure vessel 3 and the inner cylindrical section 35 of the annular sealing ring 31. An annular air flow seal 145 extends outwardly from the terminus 143 of upper section of thermal insulation 139 and rests on the upper edge 45 of the inner cylindrical section 35. A lower vertical section 147 of thermal insulation is radially outwardly spaced and disposed below the upper section 139, with a horizontally extending connecting section 149 provided, which connects upper section 139 and lower section 147.

Figure 5:
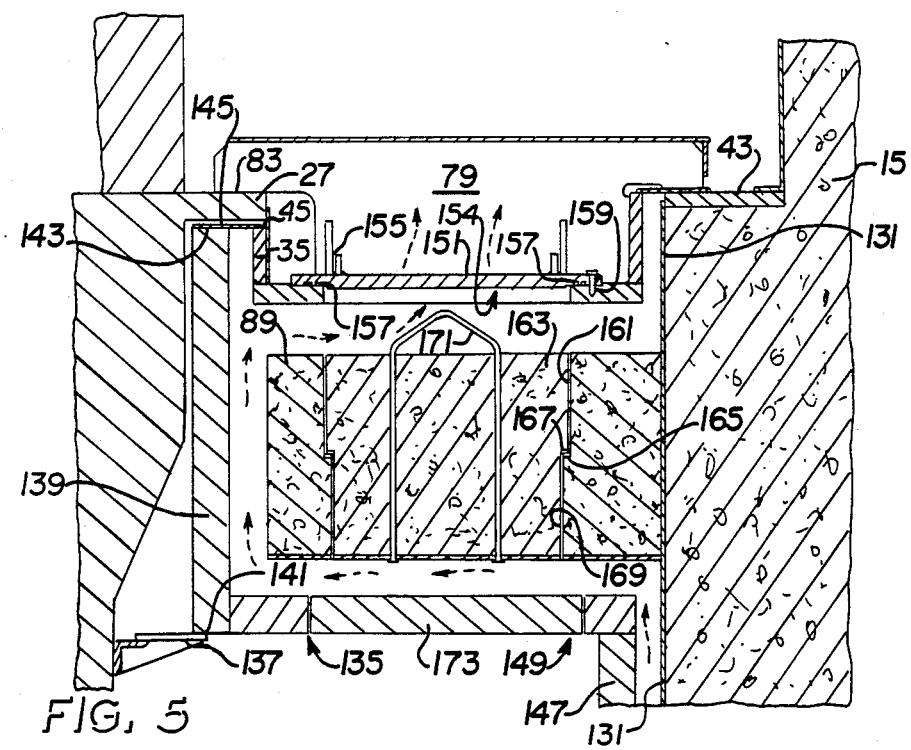
FIG. 5 is an elevational cross-sectional view of the reactor containment arrangement through a manway hatch, taken along lines V—V of FIG. 4.
Figure 6:
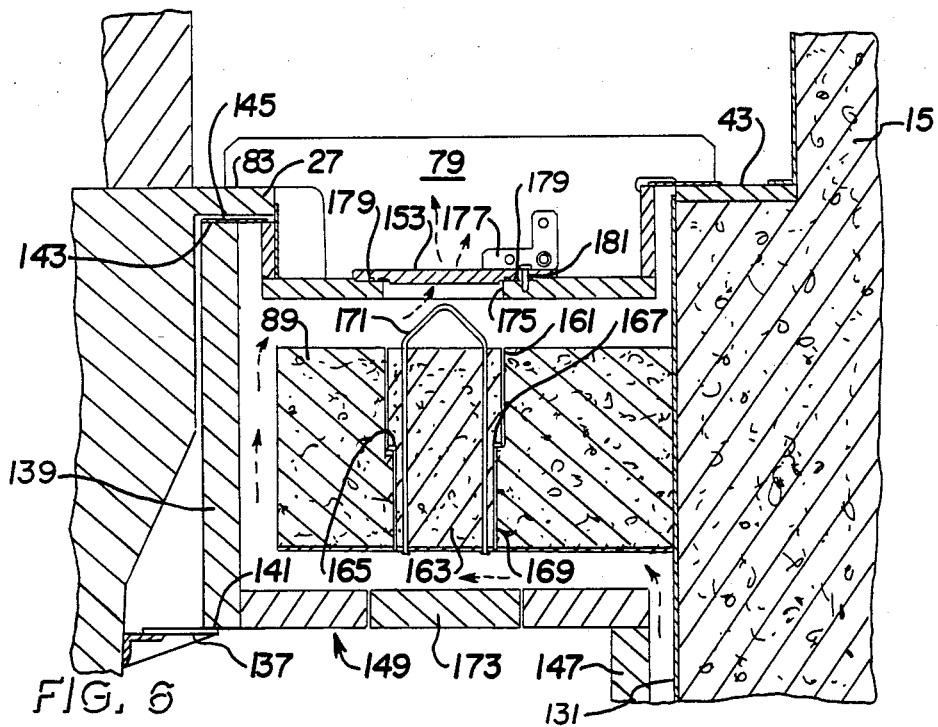
FIG. 6 is an elevational cross-sectional view through an instrumentation access hatch, taken along lines VI—VI of FIG. 4.

Means for providing access to the annular expansion gap 25 below the annular sealing ring 31 are provided, and are best illustrated in FIGS. 5 and 6. For the purpose of inspection or monitoring, manway access hatches 151 and detection well hatches 153 are provided in the support ring 33. The manway access hatches 151, six of which are shown in FIG. 4, cover manways 154 and are secured to hinges 155 which permit them to lie flat on the upper surface 115 of support ring 33 when fully open. Seals 157 are used to seal the same to the upper surface and bolts 159 are provided to fix the hatch to the upper surface 115 of the support ring 33. A section of the neutron shield 89 is cut out of the shield, to form a plug hole 161 and a removable plug 163 of the neutron shielding material used to fill the plug hole. A shoulder 165 on the removable plug 163 rests on a cooperating shoulder 167 in the wall 169 of the plug hole. A lifting bail 171 is provided secured in the the plug 163. Immediately below the plug 163, a removable door 173 is formed in the horizontally connecting section 149 of thermal insulation 137. The detection well hatches 153, four of which are shown in FIG. 4, are for service access to detector instrumentation, and cover access ports 175 in the support ring 33. The detector well hatches 153 are pivotally secured to the support ring 33 in a manner similar to that of the manway hatches 151, the hatches 153 having hinges 177. Seals 179 are used to seal the same to the upper surface and bolts 181 fix the hatch 153 to the upper surface 115 of the support ring 33. A removable door 173 is also provided in the horizontally connecting section 149 of thermal insulation 137 below a removable plug 163 disposed beneath the detection well hatch 153.

By providing the thermal insulation in the configuration of the present invention, the insulation directs the flow path of the cooling air, during reactor operation, from below the nozzles and up along the open annulus between the lower section 147 and the metal liner 131, radially inward under the neutron shields 189 and then upwardly on the inside of the shield 189. The cooling air then moves radially outwardly, as illustrated by the dashed arrows shown in FIGS. 5 and 6, above the neutron shield 189 and exits into the cavity 15 above the annular sealing ring 31 through the manway access hatches 151 and the detection well hatches 153 which are kept open during the reactor operation. The annular air flow seal 145, extending between the end 143 of the upper section of thermal insulation 139 and upper edge 45 of the inner cylindrical section 35 of the annular ring seal 131, prevents cooling air from bypassing the directed flow to the manway access hatches 151 and the detection well hatches 153. The flow area provided by the open hatches 151, 153 is greater than the flow area through the cavity annulus between the lower sction 147 and metal liner 131. This arrangement provides a cooling air outlet area which is about four times as large as some existing designs. This cooling air flow and insulation arrangement optimizes the cooling affect on the upper section of the containment wall and on the neutron shield. In a preferred arrangement, the spacing between the lower section 147 and metal shield 131 would be about 5.08 cm (2 inches), with six manway access hatches 151 provided of an inside diameter of about 50.8 cm. (20 inches) and four detection well hatches 153 provided of an inside diameter of about 24.13 cm. (9.5 inches).

To provide convenient walking and working surface during refueling, and to protect the seal surface from damage, a plurality, preferably eight or more, of removable stainless steel sections of walkway plate (not shown) is provided to rest on the type of the radial support beams 79.

What is claimed is:

1. A nuclear reactor containment arrangement including:
   a reactor pressure vessel which thermally expands and contracts during cyclic operation of the reactor, the vessel having a peripheral wall and a horizontally outwardly extending flange thereon;
   a containment wall having a shelf, said wall spaced from and surrounding the peripheral wall of the reactor pressure vessel defining an annular expansion gap therebetween, and
   an annular ring seal extending across said annular expansion gap to provide a water-tight seal therebetween, which annular ring seal comprises:
   a support ring disposed in said annular expansion gap having inner and outer upwardly extending cylindrical sections, with said inner cylindrical section disposed beneath, and spaced from, the horizontally extending flange of the reactor pressure vessel, and said outer cylindrical section having a terminus at a location substantially parallel with, and spaced from, the shelf of the containment wall;
   a vertically extending flexible inner seal, extending between said inner cylindrical section and said reactor pressure vessel flange sealing the space between said section and the horizontally extending flange of the reactor pressure vessel; and
   a horizontally extending flexible outer seal, extending between the terminus of said outer cylindrical section and the shelf of said containment wall sealing the space therebetween.

2. The nuclear reactor containment arrangement as defined in claim 1 wherein said support ring has support rods depending downwardly therefrom within said annular expansion gap and neutron shielding material is provided in said gap supported by said support rods.

3. The nuclear reactor containment arrangement as defined in claim 2 wherein said support ring and inner and outer cylindrical sections are supported within the annular expansion gap by means of radial support beams secured thereto, which radial support beams span the annular expansion gap with one end thereof resting on said horizontally outwardly extending flange and the other end on the shelf in the containment wall.

4. The nuclear reactor containment arrangement as defined in claim 3 wherein said annular seal ring is provided in a plurality of arcuate segments which are welded together after installation thereof.

5. The nuclear reactor containment arrangement as defined in claim 3 wherein said neutron shielding material is in the form of arcuate blocks of a neutron shielding material with a metal skin provided on the lower surface thereof, and fasteners are provided to pull the upper end of the support rods flush with the underside of the support ring and fixed thereto by fasteners.

6. The nuclear reactor containment arrangement as defined in claim 5 wherein the outer periphery of the neutron shield is abutted against a metal liner on the inner periphery of the containment wall.

7. The nuclear reactor containment arrangement as defined in claim 6 wherein said support ring has at least one manway therein, and a hinged, sealable access hatch is provided to close the manway.

8. The nuclear reactor containment arrangement as defined in claim 7 wherein a removable plug of neutron shielding material is provided in said neutron shield beneath said manway.

9. The nuclear reactor containment arrangement as defined in claim 8 wherein said support ring has at least one access port therein, with a hinged, sealable access hatch provided to close the port, and a removable plug of neutron shielding material is provided in said neutron shield beneath said port.

10. The nuclear reactor containment arrangement as defined in claim 6 wherein thermal insulation is provided in said annular expansion gap, including an upper vertical section extending between the peripheral wall of the reactor pressure vessel and inner cylindrical section of the annular sealing ring, a lower vertical section radially outwardly spaced and disposed below the upper vertical section, and a horizontally extending connecting section which connects said upper and lower sections.

11. The nuclear reactor containment arrangement as defined in claim 10 wherein said upper vertical section of thermal insulation has a lower end, and a platform is fixed to the peripheral wall of said reactor pressure vessel, upon which said lower end rests.

12. The nuclear reactor containment arrangement as defined in claim 11 wherein said upper vertical section of thermal insulation has an upper end which terminates closely adjacent to, but spaced from, the lower surface of said horizontally outwardly extending flange on said reactor pressure vessel.

13. The nuclear reactor containment arrangement as defined in claim 12 wherein an annular air flow seal extends outwardly for the terminus of said upper vertical section of thermal insulation and rests on the upper edge of the inner cylindrical section of said support ring, and said support ring has at least one manway and a hinged, sealable access hatch is provided to close said manway, and whereby when said manway access hatch is open, air directed upwardly through said annular expansion gap is directed through said manway.

14. The nuclear reactor containment arrangement as defined in claim 13 wherein said support ring has at least one port therein, with a hinged sealable access hatch provided to close the port, whereby when said detection hatch well is open, air directed upwardly through said annular expansion gap is directed through said port.

15. A nuclear reactor containment arrangement including:
  a reactor pressure vessel which thermally expands and contracts during cyclic operation of the reactor, the vessel having a peripheral wall and a horizontally outwardly extending flange thereon;
  a containment wall having a shelf, said wall spaced from and surrounding the peripheral wall of the reactor pressure vessel defining an annular expansion gap therebetween, and
  an annular ring seal extending across said annular expansion gap to provide a water-tight seal therebetween, which annular ring seal comprises:
  a support ring, having support rods depending downwardly therefrom and neutron shielding material supported by the support rods, the outer periphery of the neutron shielding material abutted against a metal liner on the inner periphery of the containment wall, said support ring disposed in said annular expansion gap having inner an outer upwardly extending cylindrical sections, with said inner cylindrical section disposed beneath, and spaced from, the horizontally extending flange of the reactor pressure vessel, and said outer cylindrical section having a terminus at a location substantially parallel with, and spaced from, the shelf of the containment wall;
  radial support beams secured to said support ring supporting the same in said annular expansion gap, which radial support beams span the gap with one end thereof resting on said horizontally outwardly extending flange and the other end on the shelf in the containment wall;
  a vertically extending flexible inner seal, extending between said inner cylindrical section and said reactor pressure vessel flange sealing the space between said section and the horizontally extending flange of the reactor pressure vessel;
  a horizontally extending flexible outer seal, extending between the terminus of said outer cylindrical section and the shelf of said containment wall sealing the space therebetween;
  at least one manway in said support ring with a hinged, sealable access hatch provided to close the manway;
  at least one access port in said support ring with a hinged, sealable access hatch provided to close the port;
  a removable plug of neutron shielding material beneath said manway and beneath said port; and
  thermal insulation in said annular expansion gap, including an upper vertical section extending between the peripheral wall of the reactor pressure vessel and inner cylindrical section of the annular sealing ring, a lower vertical section radially outwardly spaced and disposed below the upper vertical section, and a horizontally extending connecting section which connects said upper and lower sections.

16. The nuclear reactor containment arrangement as defined in claim 15 wherein said upper vertical section of thermal insulation has an upper end which terminates closely adjacent to, but spaced from, the lower surface of said horizontally outwardly extending flange on said reactor pressure vessel.

17. The nuclear reactor containment arrangement as defined in claim 16 wherein an annular air flow seal extends outwardly from the terminus of said upper vertical section of thermal insulation and rests on the upper edge of the inner cylindrical section of said support ring, whereby when said manway and said port are open, air directed upwardly through said annular expansion gap is directed through said manway and port.

* * * * *